US009471785B2

(12) United States Patent
Zaidi et al.

(10) Patent No.: US 9,471,785 B2
(45) Date of Patent: Oct. 18, 2016

(54) SYSTEMS AND METHODS FOR SECURE BOOT ROM PATCH

(71) Applicants: Asim A. Zaidi, Austin, TX (US); Chongbin Fan, Shanghai (CN); Fareeduddin A. Mohammed, Austin, TX (US); Mingle Sun, Shanghai (CN); Glen G. Wienecke, Fredericksburg, TX (US); Rodney D. Ziolkowski, Austin, TX (US)

(72) Inventors: Asim A. Zaidi, Austin, TX (US); Chongbin Fan, Shanghai (CN); Fareeduddin A. Mohammed, Austin, TX (US); Mingle Sun, Shanghai (CN); Glen G. Wienecke, Fredericksburg, TX (US); Rodney D. Ziolkowski, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 371 days.

(21) Appl. No.: 14/015,429

(22) Filed: Aug. 30, 2013

(65) Prior Publication Data
US 2015/0067313 A1 Mar. 5, 2015

(51) Int. Cl.
*G06F 9/00* (2006.01)
*G06F 15/177* (2006.01)
*G06F 21/57* (2013.01)

(52) U.S. Cl.
CPC .................................. *G06F 21/572* (2013.01)

(58) Field of Classification Search
None
See application file for complete search history.

(56) References Cited

U.S. PATENT DOCUMENTS

| 5,938,766 | A | * | 8/1999 | Anderson et al. | ............ 713/100 |
| 5,950,012 | A | * | 9/1999 | Shiell | ........ G06F 8/64 712/209 |
| 7,310,800 | B2 | | 12/2007 | Brouwer | |
| 7,600,003 | B1 | * | 10/2009 | Okmianski | ......... H04L 12/2801 709/217 |
| 2002/0120810 | A1 | | 8/2002 | Brouwer | |
| 2005/0159786 | A1 | * | 7/2005 | Splett | ..................... A61N 1/362 607/30 |
| 2006/0194603 | A1 | * | 8/2006 | Rudelic | ................... G06F 21/51 455/550.1 |
| 2007/0028083 | A1 | * | 2/2007 | Yu et al. | ........................... 713/1 |
| 2007/0028087 | A1 | * | 2/2007 | Yu | ...................... G06F 9/30145 713/2 |
| 2007/0113064 | A1 | * | 5/2007 | Wei | ...................... G06F 21/575 713/1 |
| 2009/0007089 | A1 | * | 1/2009 | Rothman | .................. G06F 8/65 717/168 |
| 2011/0252413 | A1 | * | 10/2011 | Maeda | ..................... G06F 8/66 717/168 |

OTHER PUBLICATIONS

ARM, "Trusted Boot Process Requirements System Software on ARM", Document No. ARM DEN 0006B-1, Copyright ARM Limited Dec. 2, 2010-Apr. 24, 2012, pp. 1-36.

* cited by examiner

Primary Examiner — Mohammed Rehman

(57) ABSTRACT

A data processing system includes a boot read only memory (ROM) configured to store boot code; one time programmable (OTP) storage circuitry configured to store patch instructions; a random access memory (RAM); and a processor coupled to the boot ROM, the OTP storage circuitry, and the RAM. The processor is configured to: in response to a reset of the data processing system, copy one or more patch instructions from the OTP storage circuitry into the RAM, and during execution of the boot code, execute a patch instruction from the RAM in place of a boot instruction of the boot code.

13 Claims, 4 Drawing Sheets

SYSTEMS AND METHODS FOR SECURE BOOT ROM PATCH

BACKGROUND

1. Field

This disclosure relates generally to semiconductor devices, and more specifically, to securely patching boot read-only memory for system-on-chip (SoC) devices.

2. Related Art

A System-on-chip (SoC) under development includes many components such as a processor, memories, peripherals and buses. Some SoCs implement on-chip boot Read Only Memories (ROMs) where others do not and implement on-chip flash or use off-chip memories for storing the instructions for bootstrapping the processor. When security is a consideration and on-chip flash is not an option, a boot ROM is preferred because once the SoC is manufactured the ROM cannot be changed. A boot ROM can also serve as trusted code for authenticating software that runs on the processor. When a processor boots up after a power-down or reset, an initialization process can include patching areas of ROM on the SoC with instructions and/or data that corrects known problems or adds additional capability. Due to security concerns, the existing on-chip ROM patch mechanism is disabled for all boot ROMs supporting secure boot. The fundamental issue is if patching is not done with care, it can weaken the trusted nature of ROM code. If left enabled, existing patch mechanisms can compromise the secure boot process due to the potential of unauthorized, untested changes being introduced.

Fixing problems without using patches in the on-chip ROM requires revised circuit masks, and with shrinking process technologies, revising one or more masks for ROM fixes are becoming more expensive. A C40 ROM mask for example is twice as expensive as C65 silicon wafer mask. Such ROM revisions also require significant development, verification effort and customer integration, which adds significant delays to product launches and hence delayed revenue. It is very desirable to have a secure on-chip ROM patch mechanism to work around issues and changing requirements once the SoC has been manufactured without having to create new silicon wafer masks.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods are disclosed that provide capability to securely patch on-chip read-only memory (ROM) in a system on chip (SoC) semiconductor device. In some embodiments, the ROM patch code or instructions is securely programmed in one-time programmable (OTP) storage circuitry such as electronic fuses that reside on the SoC. The ROM patch code thus has the same secure attributes as the existing boot ROM and a lock mechanism prevents the ROM patch code from being modified once the SoC is delivered by the manufacturer. New boot ROM code issues can be securely patched without affecting the integrity of the secure boot process. The ability to patch secure boot ROM code as disclosed herein without the need to develop and qualify new silicon wafer masks for the SoC saves cost, and improves efficiency.

Figure 1:
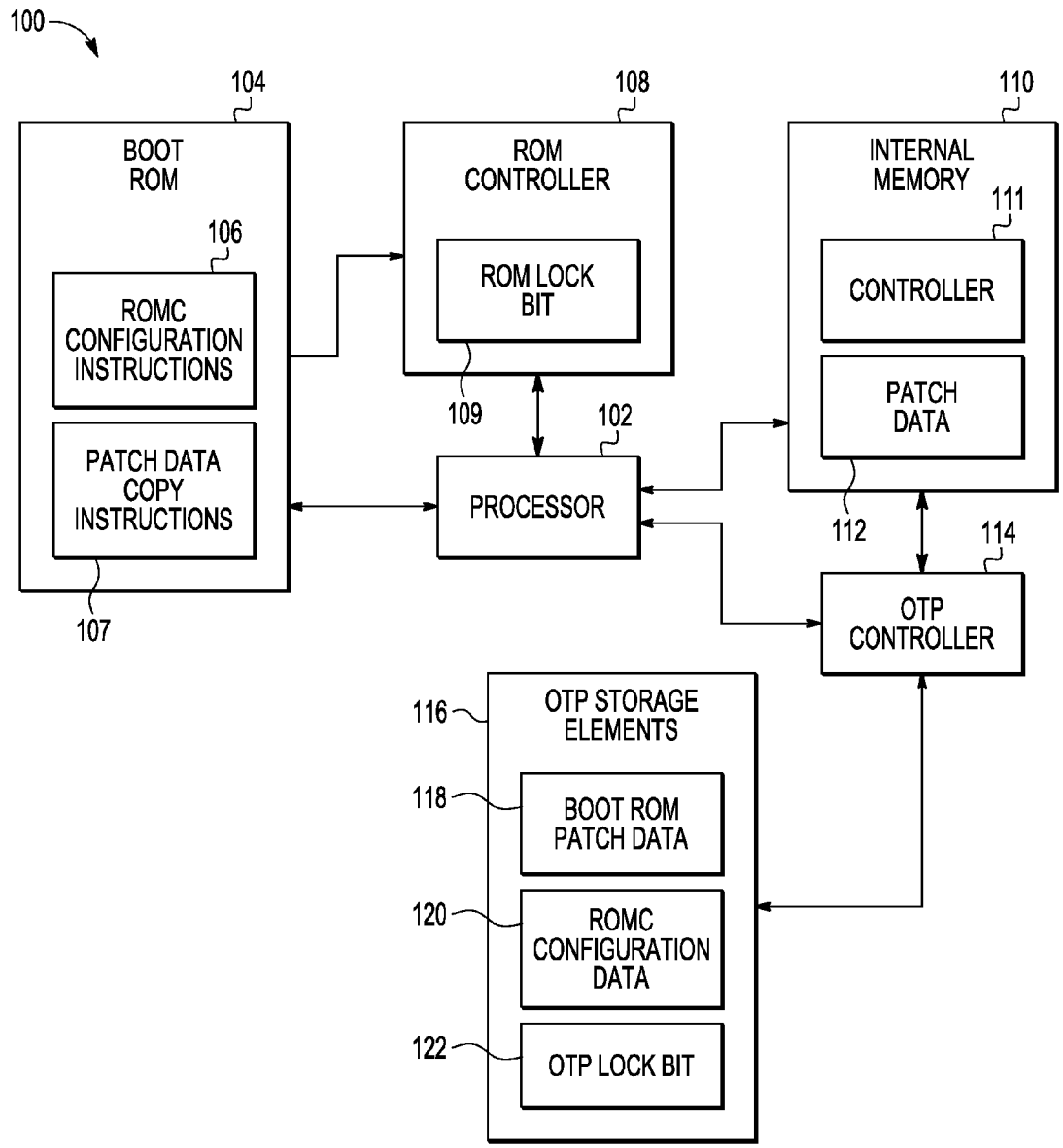
FIG. 1 illustrates a block diagram of an embodiment of a system-on-chip (SoC) in accordance with the present disclosure.

FIG. 1 illustrates a block diagram of an embodiment of a system-on-chip (SoC) processing system 100 in accordance with the present disclosure that includes processor 102, boot ROM 104 with ROM controller (ROMC) configuration instructions 106 and patch data copy instructions 107, ROM controller 108 with register 109 for storing a ROM lock bit, internal memory 110 with memory controller 111 and patch data 112, one-time program (OTP) controller 114, and OTP storage elements 116 with boot ROM patch data 118, ROMC configuration data 120, and a register or element for storing OTP lock bit 122.

SoC 100 is an information handling system which can be designed to give independent computing power to one or more users. SoC 100 may be used in many devices including but not limited to mainframes, minicomputers, servers, workstations, personal computers, notepads, electronic readers, personal digital assistants, electronic games, automobiles, aircraft, machinery, embedded systems, and cell phones and various other wireless devices. SoC includes at least one processor 102. SoC 100 processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process.

SoC 100 can include any number of separate integrated circuits or separate devices interconnected with each other. For example, internal memory 110 may be located on a same integrated circuit as processor 102. Additional memory may be located on a separate integrated circuit or located within another peripheral or slave discretely separate from other elements of SoC 100. In some embodiments, patch data 112 is only stored in memory that is internal to SoC 100 to reduce the potential for unauthorized tampering with patch data 112.

Boot ROM 104 can be implemented using any suitable type of ROM that can be programmed with data once, and read as often as required. ROMC configuration instructions 106 include processor instructions that read ROMC configuration data 120 and program the configuration data in ROM controller 108. The ROMC configuration data 120 can be used to configure a target address in internal memory 110 where a patch may begin, among other information. Patch data copy instructions 107 include executable instructions that may be used by processor 102 to copy the boot ROM patch data 118 to patch data 112 of internal memory 110.

ROM controller 108 is a processing unit with logic instructions that, among other functions, assert or deassert the ROM lock bit in register 109. For example, when a secure boot ROM patch is available, ROM controller 108 can set the ROM lock bit to lock the configuration of ROM controller 108.

Internal memory 110 can be any suitable random access memory (RAM) that includes memory controller 111 and storage elements for storing patch data 112. Memory controller 111 controls write access to patch data 112, among other functions.

OTP controller 114 includes a processing module or circuit that executes logic instructions to, among other functions, access OTP storage elements 116 for boot ROM patch data 118, ROMC configuration data 120, and OTP lock bit 122. OTP storage elements 116 can be implemented using any suitable device that is written once but can be read as often as required. For example, OTP storage elements 116 can be implemented using electronic fuses or other one-time programmable non-volatile memory.

OTP lock bit 122 can be used to prevent changes to boot ROM patch data 118 and ROMC configuration data 120 once boot ROM patch data 118 and ROMC configuration data 120 have been written to OTP storage elements 116.

Figure 2:
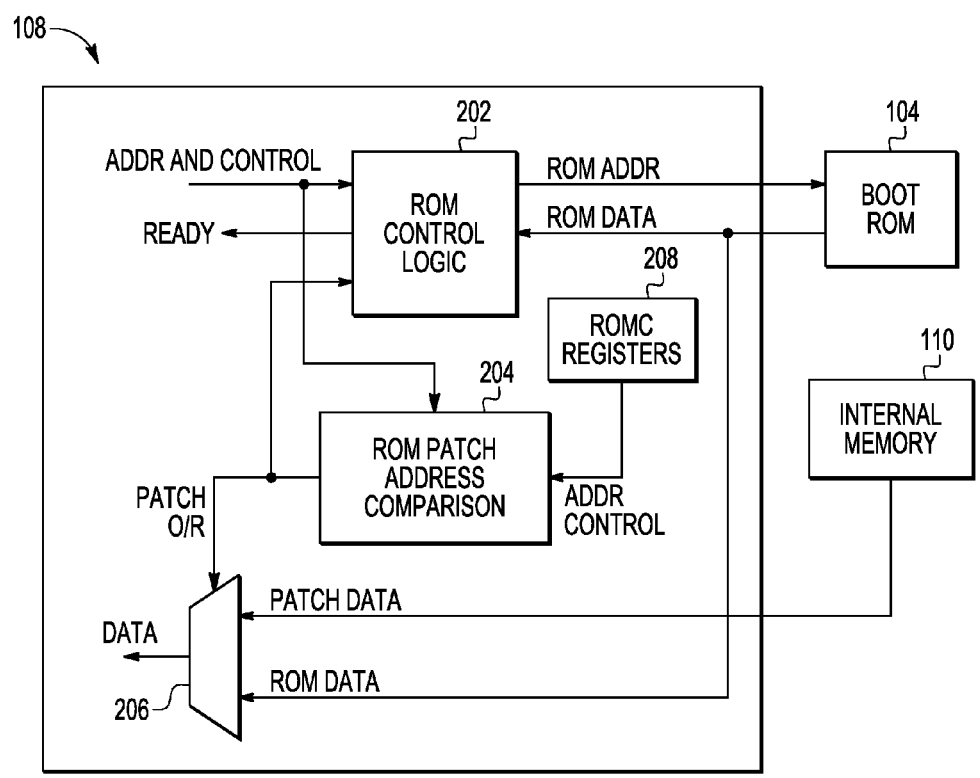
FIG. 2 illustrates a block diagram of an embodiment of a read-only memory (ROM) controller that can be used in the SoC of FIG. 1.

FIG. 2 illustrates a block diagram of an embodiment of a read-only memory (ROM) controller 108 that can be used in the SoC 100 of FIG. 1, including ROM control logic 202, ROM patch address comparison logic 204, multiplexer 206, and ROMC registers 208. ROM control logic 202 receives address and control signals from processor 102, provides a ROM address to boot ROM 104, receives ROM data from boot ROM 104, and sends a READY signal to processor 102. The READY signal can be used to enable processor 102 to begin executing once the ROM controller provides an address of an instruction. The address provided to ROM control logic 202 is the starting address of boot ROM instructions.

ROMC registers 208 store ROMC configuration data 120, which includes addresses that match addresses of instructions residing in boot ROM 104.

ROM patch address comparison logic 204 receives respective address signals from ROMC registers 208 and ROM control logic 202 and provides a patch override signal to control operation of multiplexer 206. For example, when the address from ROM control logic 202 matches one of the addresses from ROMC registers 208, the patch override signal is set to select the patch data as the output of multiplexer 206. When the address from ROM control logic 202 does not match an address from ROMC registers 208, the patch override signal is set to select the ROM data as the output of multiplexer 206.

Figure 3:
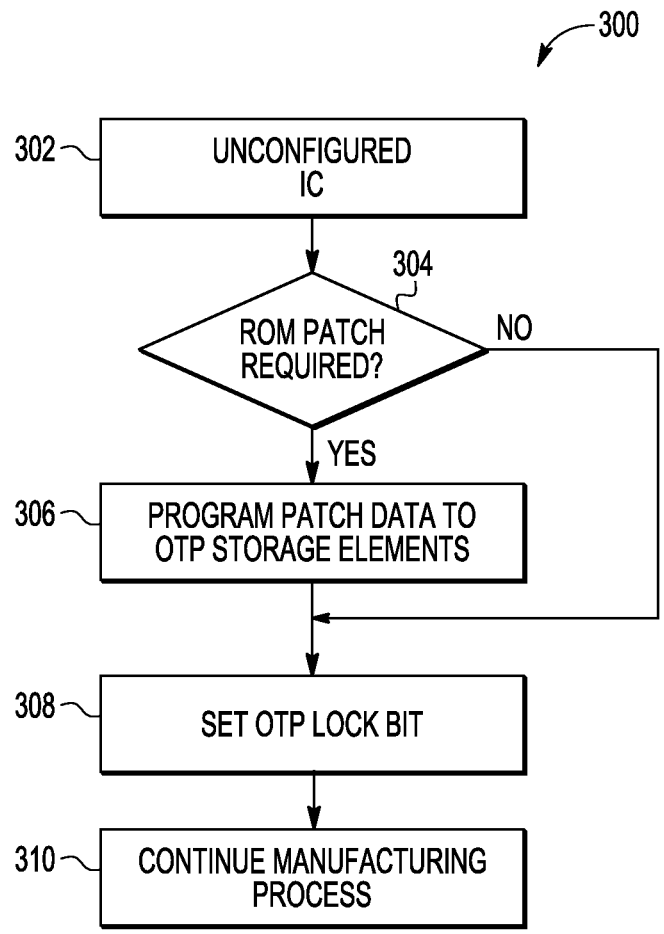
FIG. 3 illustrates a flow diagram of a method for configuring the SoC of FIG. 1 during manufacturing using a secure boot ROM capability.

FIG. 3 illustrates a flow diagram of a method 300 for configuring the SoC 100 of FIG. 1 using secure boot ROM during manufacturing. Process 302 includes receiving an integrated circuit or SoC in which the OTP storage elements have not been programmed.

Process 304 includes determining if a boot ROM patch is required and can be implemented, for example, by an automated system that can access revision information for the IC die being manufactured. If the revision information indicates that patch data is available for the particular IC die, then process 306 includes programming the patch data to the OTP storage elements 116 (FIG. 1). Whether or not a ROM patch is required, process 308 can then set the OTP lock bit to prevent further programming of boot ROM patch data 118 and ROMC configuration data 120 in OTP storage elements 116. Process 310 includes continuing the manufacturing process as conventionally performed.

Figure 4:
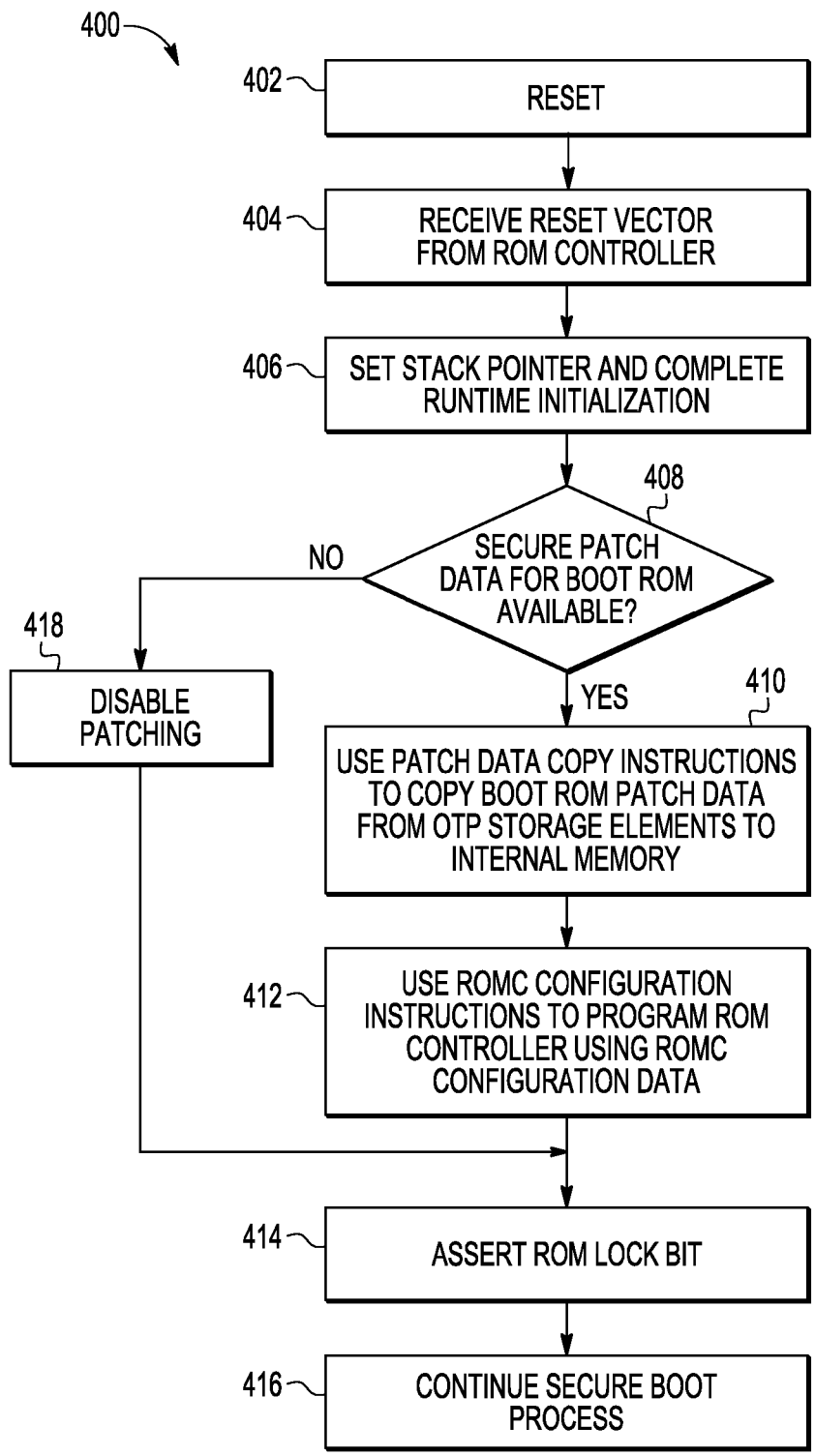
FIG. 4 illustrates a flow diagram of a method for patching the boot ROM of the SoC of FIG. 1 in accordance with the present disclosure.

Referring to FIGS. 1 and 4, FIG. 4 illustrates a flow diagram of a method 400 for patching the boot ROM 104 of the SoC 100 of FIG. 1 in accordance with the present disclosure. Process 402 includes receiving a RESET signal in the SoC 100 as a result of a reset event, such as power-on or reset initiation by a user. Process 404 includes receiving a reset vector from a ROM controller 108. The reset vector includes an address of an instruction for a processor or core 102 to begin execution. Process 406 includes setting a stack pointer and completing runtime initialization, which provides information required by the processor 102 to start a boot-up procedure.

Process 408 includes determining whether secure patch data for boot ROM 104 is available. In some implementations, processor 102 can access OTP storage elements 116 to see whether one or more specified identifiers for secure patch data has been programmed in the OTP storage elements 116. The boot ROM patch data 118 can include multiple sets of patch data, and each set of patch data can include a unique identifier for the particular patch, an address of the boot ROM 104 where the patch is used, the type of patch such as an OPCODE or data patch, the size of the patch, and the patch data. Other suitable information can be included in the patch data. When secure boot ROM patch data is available, process 410 includes using corresponding patch data copy instructions 107 to copy boot ROM patch data 118 from the OTP storage elements 116 to patch data 112 in internal memory 110.

Once process 410 is completed, process 412 can use ROMC configuration instructions 106 to program the ROM controller 108 using the ROMC configuration data 120. Process 414 then asserts the ROM lock bit, and process 416 continues the secure boot process.

Referring again to process 408, if secure patch data for the boot ROM is not available, process 408 transitions to process 418 to disable patching the boot ROM 104. Process 418 then transitions to process 414 to assert the ROM lock bit and to process 416 to continue the secure boot process.

By now it should be appreciated that in one embodiment, there has been provided a data processing system that can include a boot read only memory (ROM) configured to store boot code, one time programmable (OTP) storage circuitry configured to store patch instructions, a random access memory (RAM), and a processor coupled to the boot ROM, the OTP storage circuitry, and the RAM. The processing system is configured to, in response to a reset of the data processing system, copy one or more patch instructions from the OTP storage circuitry into the RAM, and during execution of the boot code, execute a patch instruction from the RAM in place of a boot instruction of the boot code.

In another aspect, the data processing system can further comprise storage circuitry configured to store a ROM lock bit. The processor can be configured to assert the ROM lock bit after the one or more patch instructions are copied from the OTP storage circuitry into the RAM.

In another aspect, the data processing system can further comprise a ROM controller coupled to the ROM. The OTP is configured to store ROM controller configuration data.

In another aspect, the processor can be further configured to, in response to the reset of the data processing system, use the ROM controller configuration data to configure the ROM controller. The ROM controller configuration data can indicate a location in the RAM of the patch instruction.

In another aspect, the boot code can comprise ROM controller configuration instructions. The processor can be configured to, in response to the reset of the data processing system, use the ROM controller configuration data to configure the ROM controller in response to execution of the ROM controller configuration instructions from the ROM.

In another aspect, the processor can be configured to, in response to the reset of the data processing system, determine whether at least one patch instruction for the boot code is available. Copying of the one or more patch instructions from the OTP storage circuitry into the RAM can be performed in response to determining that at least one patch instruction for the boot code is available.

In another aspect, the processor can be configured to, in response to the reset of the data processing system, disable ROM patching if no patch instructions are available.

In another aspect, the boot code can comprise patch copy instructions. The processor can be configured to, in response to the reset of the data processing system, copy the one or more patch instructions from the OTP storage circuitry into the RAM in response to execution of the patch copy instructions from the ROM.

In another embodiment, in a data processing system having a boot read only memory (ROM), one time programmable (OTP) storage circuitry, and a random access memory (RAM), a method can comprise receiving a system reset, in response to the system reset, copying at least one patch instruction from the OTP storage circuitry to the RAM, and executing boot code from the boot ROM. During executing the boot code, a patch instruction of the at least one patch instruction in the RAM can be executed in place of a boot instruction of the boot code.

In another aspect, the method can further comprise, in response to the system reset, executing configuration instructions of the boot code to configure a ROM controller coupled to the ROM using configuration data stored in the OTP storage circuitry.

In another aspect, the ROM configuration data can indicate a location in the RAM of the patch instruction.

In another aspect, the method can further comprise, after copying the at least one patch instruction from the OTP storage circuitry to the RAM, asserting a lock bit of the ROM controller to indicate completion of configuring the ROM.

In another aspect, the method can further comprise, in response to the system reset, receiving a reset vector which indicates a location of the boot code in the boot ROM.

In another aspect, the method can further comprise, in response to the system reset, prior to copying the at least one patch instruction from the OTP storage circuitry to the RAM, determining that the OTP has one or more available patch instructions.

In another embodiment, a data processing system can comprise a boot read only memory (ROM) configured to store boot code which includes patch copy instructions, a ROM controller coupled to the boot ROM, one time programmable (OTP) storage circuitry configured to store patch instructions, a random access memory (RAM), and a processor coupled to the boot ROM, the ROM controller, the OTP storage circuitry, and the RAM. The data processing system can be configured to, in response to a reset of the data processing system, begin executing the boot code at a location indicated by a reset vector received from the ROM controller, execute the patch copy instructions to copy at least one patch instruction from the OTP storage circuitry into the RAM, and continue executing the boot code. During execution of the boot code, a patch instruction from the RAM can be executed in place of a boot instruction of the boot code.

In another aspect, the data processing system can further comprise storage circuitry configured to store a ROM lock bit. The processor can be configured to assert the ROM lock bit after the at least one patch instruction is copied from the OTP storage circuitry into the RAM.

In another aspect, the boot code can include ROM controller configuration instructions and the OTP can be configured to store ROM controller configuration data.

In another aspect, the processor can be further configured to execute the ROM controller configuration instructions to configure the ROM controller using the ROM controller configuration data. The ROM controller configuration data can indicate a location in the RAM of the patch instruction.

In another aspect, the data processing system can be further configured to in response to the reset of the data processing system, determine whether any patch instructions for the boot code is available. Copying of the at least one patch instruction from the OTP storage circuitry into the RAM can be performed in response to determining that one or more patch instructions for the boot code is available.

In another aspect, the data processing system can be further configured to, in response to the reset of the data processing system, disable ROM patching if no patch instructions are available within the OTP.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
   a boot read only memory (ROM) configured to store boot code;
   one time programmable (OTP) storage circuitry configured to store patch instructions;
   a random access memory (RAM);
   a processor coupled to the boot ROM, the OTP storage circuitry, and the RAM, and configured to:
   in response to a reset of the data processing system, copy one or more patch instructions from the OTP storage circuitry into the RAM, and
   during execution of the boot code, execute one or more of the patch instructions from the RAM in place of a boot instruction of the boot code; and
   a ROM controller coupled to the ROM, wherein the OTP is configured to store ROM controller configuration data, and the processor is further configured to:
   in response to the reset of the data processing system, use the ROM controller configuration data to configure the ROM controller, wherein the ROM controller configuration data indicates a location in the RAM of the patch instruction; and
   storage circuitry configured to store a ROM lock bit, wherein the processor is configured to assert the ROM lock bit after the one or more patch instructions are copied from the OTP storage circuitry into the RAM.

2. The data processing system of claim 1, wherein the boot code comprises ROM controller configuration instructions, wherein the processor is configured to, in response to the reset of the data processing system, use the ROM controller configuration data to configure the ROM controller in response to execution of the ROM controller configuration instructions from the ROM.

3. The data processing system of claim 1, wherein the processor is configured to:
   in response to the reset of the data processing system, determine whether at least one patch instruction for the boot code is available, wherein the copying of the one or more patch instructions from the OTP storage circuitry into the RAM is performed in response to determining that at least one patch instruction for the boot code is available.

4. The data processing system of claim 1, wherein the processor is configured to, in response to the reset of the data processing system, disable ROM patching if no patch instructions are available.

5. The data processing system of claim 1, wherein the boot code comprises patch copy instructions, wherein the processor is configured to, in response to the reset of the data processing system, copy the one or more patch instructions from the OTP storage circuitry into the RAM in response to execution of the patch copy instructions from the ROM.

6. In a data processing system having a boot read only memory (ROM), one time programmable (OTP) storage circuitry, and a random access memory (RAM), a method comprising:
   receiving a system reset signal;
   in response to the system reset signal, copying at least one patch instruction from the OTP storage circuitry to the RAM;
   executing boot code from the boot ROM, wherein during executing the boot code, a patch instruction of the at least one patch instruction in the RAM is executed in place of a boot instruction of the boot code;
   in response to the system reset signal, executing configuration instructions of the boot code from the boot ROM to configure a ROM controller coupled to the ROM using configuration data stored in the OTP storage circuitry, wherein the ROM configuration data indicates a location in the RAM of the patch instruction; and
   after copying the at least one patch instruction from the OTP storage circuitry to the RAM, asserting a lock bit of the ROM controller to indicate completion of configuring the ROM.

7. The method of claim 6, further comprising:
in response to the system reset signal, receiving a reset vector which indicates a location of the boot code in the boot ROM.

8. The method of claim 6, further comprising:
in response to the system reset signal, prior to copying the at least one patch instruction from the OTP storage circuitry to the RAM, determining that the OTP has one or more available patch instructions.

9. A data processing system comprising:
a boot read only memory (ROM) configured to store boot code which includes patch copy instructions;
a ROM controller coupled to the boot ROM;
one time programmable (OTP) storage circuitry configured to store patch instructions;
a random access memory (RAM); and
a processor coupled to the boot ROM, the ROM controller, the OTP storage circuitry, and the RAM, and configured to, in response to a reset of the data processing system:
begin executing the boot code at a location indicated by a reset vector received from the ROM controller;
execute the patch copy instructions to copy at least one patch instruction from the OTP storage circuitry into the RAM, and
continue executing the boot code, wherein during execution of the boot code, the at least one patch instruction from the RAM is executed in place of a boot instruction of the boot code; and
storage circuitry configured to store a ROM lock bit, wherein the processor is configured to assert the ROM lock bit after the at least one patch instruction is copied from the OTP storage circuitry into the RAM.

10. The data processing system of claim 9, wherein the boot code includes ROM controller configuration instructions and the OTP is configured to store ROM controller configuration data.

11. The data processing system of claim 10, wherein the processor is further configured to:
execute the ROM controller configuration instructions to configure the ROM controller using the ROM controller configuration data, wherein the ROM controller configuration data indicates a location in the RAM of the patch instruction.

12. The data processing system of claim 9, wherein the processor is configured to:
in response to the reset of the data processing system, determine whether any patch instructions for the boot code is available, wherein the copying of the at least one patch instruction from the OTP storage circuitry into the RAM is performed in response to determining that one or more patch instructions for the boot code is available.

13. The data processing system of claim 9, wherein the processor is configured to, in response to the reset of the data processing system, disable ROM patching if no patch instructions are available within the OTP.

* * * * *